Figure 1:
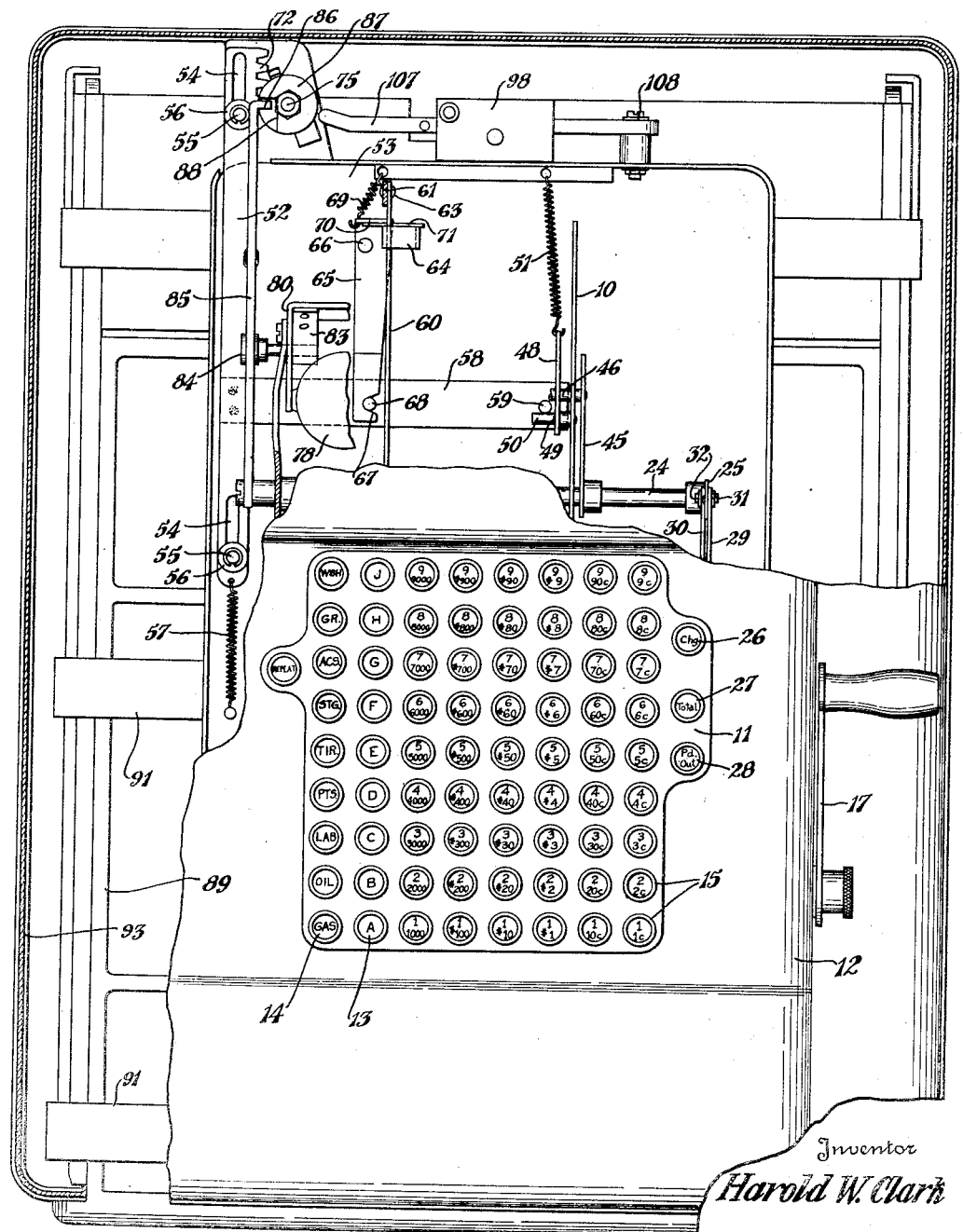

Nov. 9, 1937.  H. W. CLARK  2,098,486
CASH REGISTER
Filed March 2, 1936  3 Sheets-Sheet 1

Inventor
Harold W. Clark
By Fraser and Bishop
Attorneys

Nov. 9, 1937. H. W. CLARK 2,098,486
CASH REGISTER
Filed March 2, 1936 3 Sheets-Sheet 2
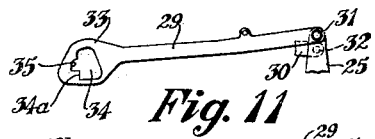
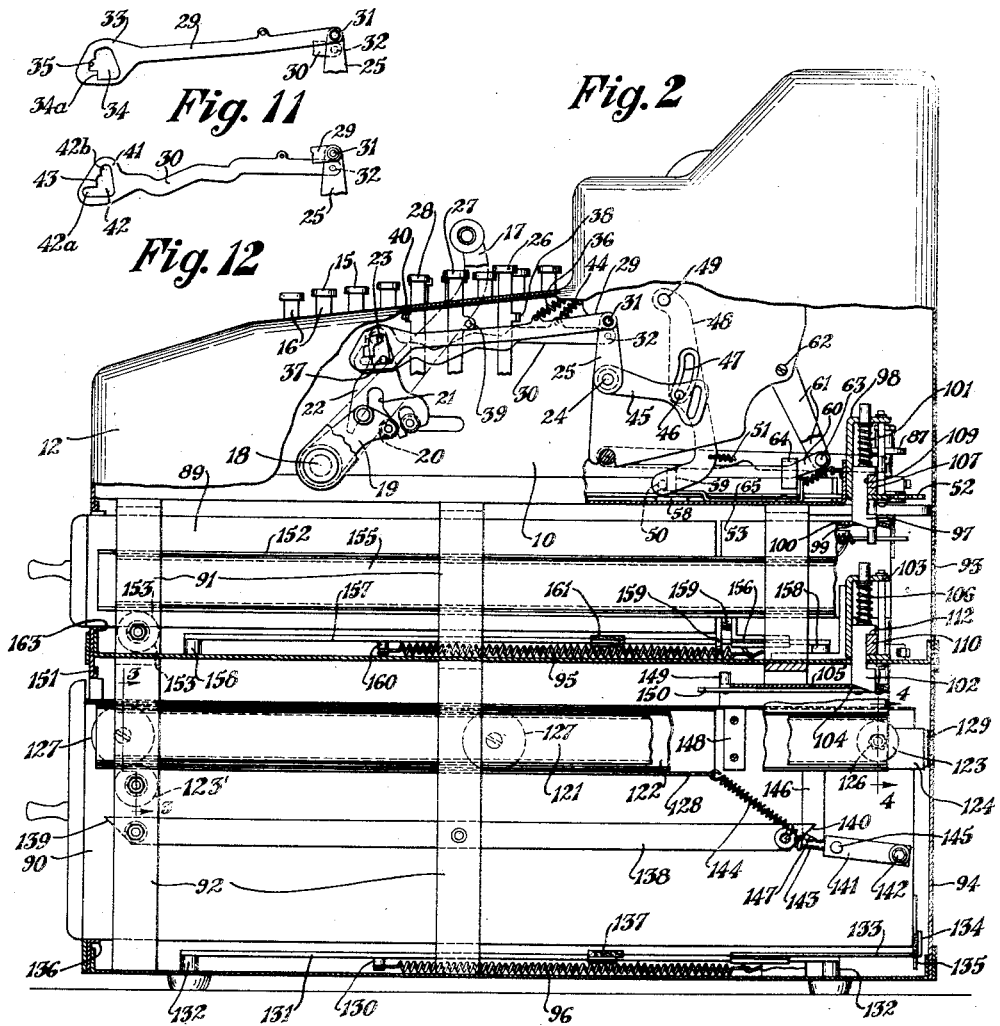
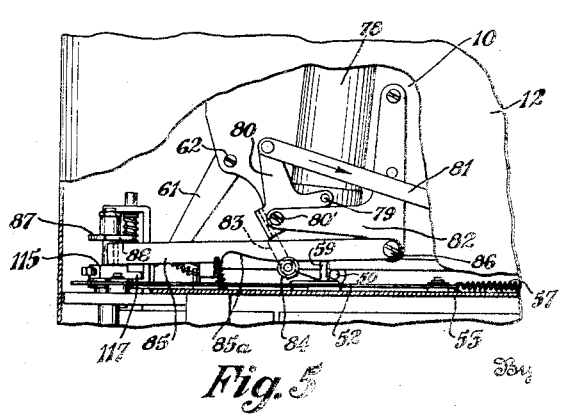
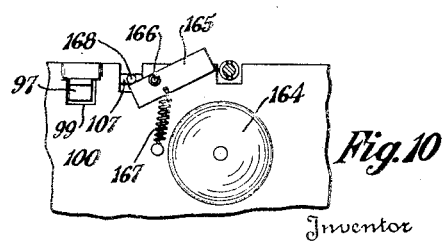
Inventor
Harold W. Clark

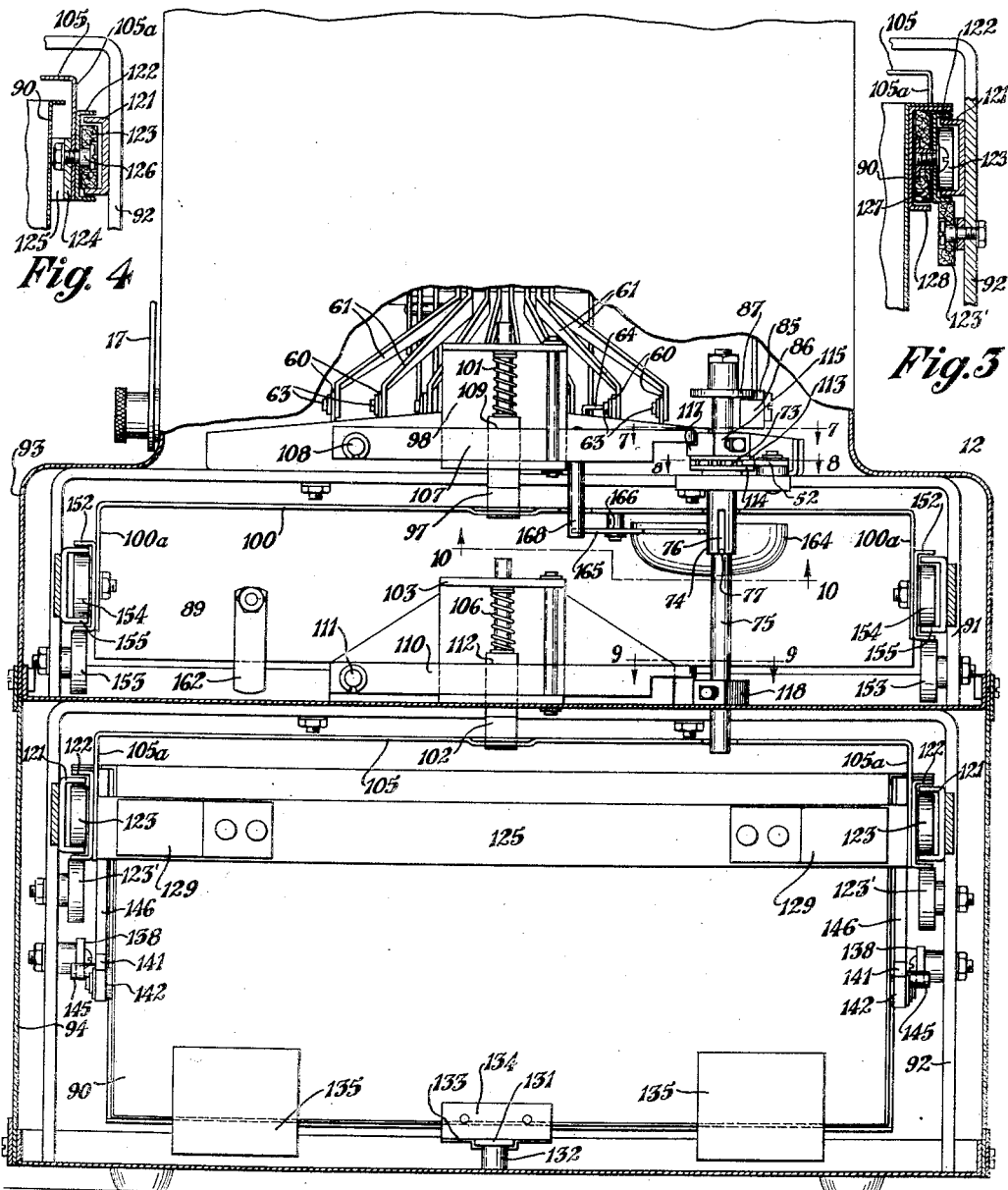

Patented Nov. 9, 1937

2,098,486

UNITED STATES PATENT OFFICE 2,098,486

CASH REGISTER

Harold W. Clark, Alliance, Ohio, assignor to The McCaskey Register Company, Alliance, Ohio, a corporation of Ohio Application March 2, 1936, Serial No. 66,620

7 Claims. (Cl. 235—22)

The invention relates to cash registers and more particularly to a register provided with enforced registration mechanism requiring the operation of a clerk or department designating key to operate the drawer opening mechanism, and especially to a multiple drawer register which may be provided with two or more cash drawers or with cash and credit drawers with selective means for causing the opening of the drawers.

An object of the improvement is to provide a cash register provided with a drawer adapted to be opened by operation of the operating handle or similar means of the register in usual manner and having means operated by a clerk or department designating key normally rendering said drawer opening means inoperative until said designating key is depressed.

Another object is to provide a multiple drawer register provided either with multiple cash drawers or with cash and credit drawers adapted to be opened in the manner referred to, selective means being provided for rendering the drawer opening means operative.

A further object of the improvement is to provide novel means for slidably supporting the drawers in the machine, and for opening the drawers when the machine is properly operated.

The above objects, together with others which will be apparent from the drawings and following description, or which may be later pointed out, may be attained by constructing the improved register in the manner illustrated in the accompanying drawings, in which Figure 1 is a top plan view of a register embodying the invention, parts being broken away for the purpose of illustration;

Fig. 2, a side elevation of the register on a smaller scale showing the register provided with a cash drawer and a credit drawer, parts being broken away to illustrate the interior mechanism;

Fig. 3, an enlarged fragmentary detail section on the line 3—3, Fig. 2;

Fig. 4, an enlarged detail section on the line 4—4, Fig. 2;

Fig. 5, a fragmentary sectional elevation showing the usual dashpot and the manner in which the improved mechanism is associated therewith;

Fig. 6, a rear elevation of the improved register with parts broken away;

Fig. 7, a section on the line 7—7, Fig. 6;

Fig. 8, a section on the line 8—8, Fig. 6;

Fig. 9, a section on the line 9—9, Fig. 6;

Fig. 10, a section on the line 10—10, Fig. 6;

Fig. 11, a detail elevation of the signalling link which controls the operation of the cash drawer; and Fig. 12, a similar view of the signalling link which controls the operation of the credit drawer.

Similar numerals refer to similar parts throughout the drawings.

The invention is illustrated as applied to a combined cash and credit register including an adding and listing mechanism of the general character of Johantgen Patent No. 1,336,840 having enforced registration means for selectively controlling the opening of the cash drawer and the credit drawer.

The adding and listing mechanism is supported upon a frame indicated generally at 10 of usual and ordinary construction, supporting the keyboard 11 and enclosed as by the usual sheet metal housing 12. The keys are shown arranged in eight rows or banks, each row extending from front to rear of the keyboard and the first six rows of keys on the right are numbered respectively from 1 to 9. The seventh row, indicated at 13, is provided with suitable symbols designating clerks or departments and the eighth row, indicated generally at 14, may be provided with suitable symbols indicating various items of stock. Each key comprises a finger piece 15 and a stem 16, the latter reciprocating through slots in the cover plate.

The keys may be depressed against the resistance of springs to cooperate with and determine the movement of a series of rack bars, one for each row of keys, these rack bars being adapted to turn a set of accumulator wheels, the several keys determining the range of movement of the rack bars.

As thus outlined, the adding and listing mechanism is of a common and well known type, but as to various features as hereinafter pointed out, it presents elements of novelty in structure and function. The usual operating handle 17 is provided for actuating the rack bars and other movable parts of the machine, and the usual printing mechanism arranged to be set by means of the keys and operated by said handle.

The operating handle is fixed upon the usual rocker shaft 18, upon which is also fixed the usual rocker arm 19 provided with the cam roller 20 for engagement in the flared cam notch 21 of the oscillating plate 22 pivoted at its upper end to the frame as at 23, all as in usual manner in adding machines of this general type.

The rocker shaft 24 journaled through the frame 10 and provided with the rocker arm 25 is common to such machines. This rocker arm 25 is ordinarily operatively connected to the oscillating plate 22 by means of a signalling link adapted to be set in different operative positions by the charge key 26, the total key 27 and the paid out key 28.

In carrying out the present improvement, two signalling links indicated generally at 29 and 30 (Fig. 2) are provided for operatively connecting the rocker arm 25 to the oscillating plate 22, the outer link 29 being adapted to be set in operative position by the paid out key 28 while the inner or rear signalling link 30 is adapted to be set in operative positions by the charge key 26 and the total key 27.

The signalling link 29 (Fig. 11) is pivotally connected at one end to the upper end of the rocker arm 25, as indicated at 31, and the link 30 is similarly connected to an intermediate point of said rocker arm 25, as indicated at 32.

The link 29 has an enlargement 33 at its free end provided with an opening 34 preferably wider at its lower end, and having a notch 35 in its outer side edge at a point intermediate the top and bottom of the opening. A spring 36 is provided for normally pulling the link 29 upward so that the lower edge of the opening 34 engages the pin 37 upon the oscillating plate 22.

The charge key 26 (Fig. 2) is provided with an angular lug 38 of sufficient length to contact the upper edge of the link 30 and swing the same downward upon its pivot, when the key 26 is depressed. The total key 27 is provided with a stud 39 also of sufficient length to contact the upper edge of the link 30. An angular lug 40 is formed upon the paid out key 28 and is of sufficient length to contact the upper edge of the outer or front link 29.

An enlargement 41 is formed at the free end of the link 30 (Fig. 12) and provided with a substantially L-shaped opening 42 having an intermediate recess 43 therein. A spring 44 is provided for normally urging the link 30 upward so as to hold the lower edge of the opening 42 in contact with the pin 37 upon the oscillating plate.

A rocker arm 45 (Fig. 2) is fixed upon the rocker shaft 24 and carries a stud 46 which engages in an arcuate slot 47 in the stop lever 48 which is pivoted at its upper end as at 49 upon the frame of the machine and provided at its lower end with a stop pin 50, a spring 51 normally urging the lower end of said stop lever toward the rear end of the machine.

A rack bar 52 (Fig. 1) is slidably mounted upon the bottom plate 53 of the adding machine, being provided with elongated slots 54 slidably received upon the studs 55 carried by said bottom plate and provided with washers 56 for retaining the rack bar in position thereon. A spring 57 is provided for normally urging the rack bar toward the front end of the adding machine.

An angular bar 58 is fixed upon the rack bar 52 and provided with a stud 59 adapted to engage the stop pin 50 upon the stop lever 48 to limit the forward movement of the rack bar 52. As in usual practice, each bank of keys has associated therewith a link connected to a bell crank lever through which the type bars are operated, this link being allowed to move forward by the depression of any key in the corresponding bank. These links are indicated at 60 (Fig. 6) and the lower arms of the bell crank levers are shown at 61 fulcrumed as at 62 upon the frame and pivotally connected as at 63 to the corresponding links. The link 60 associated with the bank 13 of clerks' or department keys, has a stop flange or lug, which may be in the form of a yoke 64 fixed thereon for normally holding the locking lever 65 (Fig. 1) in operative position.

This locking lever is pivoted as at 66 upon the frame and is provided at its free end with a notch 67 adapted to normally receive the locking stud 68 upon the bar 58. A spring 69 normally urges the locking lever 65 into position to release the locking stud 68 from the notch 67 of the lever but in the normal position of the parts, the stop flange or yoke 64 engages the upturned angular flange 70 upon the locking lever 65 and holds the same in the locking position, as shown in Fig. 1. In order to take up any lost motion between the parts, a spring 71 may be carried by the angular flange 70 of the locking lever for engagement with the stop flange or yoke 64.

The rack bar 52 is provided at its rear end with rack teeth 72 meshing with a pinion 73 (Fig. 8) fixed upon the sleeve 74 which is slidably keyed upon the vertical shaft 75 which is journaled through the rear portion of the frame of the machine. The sleeve 74 may be keyed upon the shaft 75 as by the longitudinal slot 76 in the sleeve engaging the stud 77 in the shaft. The shaft 75 is mounted for vertical sliding movement, as well as for rotation, in its journals.

The usual dashpot 78 (Fig. 5) is provided in the machine and pivotally connected in usual manner as at 79 to one arm of the bell crank yoke 80, the other arm of which is connected to the link 81 operated through the usual mechanism, in the direction of the arrow shown in Fig. 5, when the operating handle is pulled. This bell crank yoke is fulcrumed as at 80' upon a bracket 82 fixed upon the frame 10 and for the purpose of the present improvement has an arm 83 fixed thereon carrying a cam roller 84 adapted to cooperate with the lifting lever 85 fulcrumed as at 86 upon the bracket 82.

The lifting lever 85 is provided at its rear end with the angular flange 86 located beneath the collar 87 upon the shaft 75 and adapted to be normally located beneath the cut-out portion 88 of said collar as shown in Fig. 1, whereby raising of the lever 85 will permit the angular end 86 thereof to pass upward through said cut-out portion of the collar without moving the shaft 75.

The apparatus illustrated is shown provided with a cash drawer 89 (Figs. 2 and 6) located beneath the adding and listing mechanism and a credit drawer 90 located beneath the cash drawer. These drawers are slidably mounted within chassis indicated generally at 91 and 92 respectively and enclosed by housings 93 and 94 respectively. A pull spring 95 is provided for normally urging the cash drawer to open position and a pull spring 96 is similarly provided for normally urging the credit drawer to open position.

For the purpose of normally holding the cash drawer in closed position, a latch bolt 97 is vertically slidably mounted within a bracket 98 and normally urged downward as by the spring 101, into the recess 99, formed in a plate 100 extending across the rear upper portion of the cash drawer.

In the same manner, the credit drawer is normally held in closed position by the latch bolt 102 vertically slidably mounted in the bracket 103 and normally urged downward into engagement with the recess 104 in the plate 105, by means of the spring 106.

A lifting bar 107 (Figs. 1 and 2) is pivoted as at 108 upon some stationary portion of the machine and located through a notch 109 in the rear side of the latch bolt 97. It will be seen that by raising the free end of the lifting bar 107, the latch bolt 97 may be raised out of engagement with the recess 99 in the plate 100 of the cash drawer 89, permitting the spring 95 to open said drawer.

A similar lifting bar 110 (Figs. 2 and 9) is pivoted as at 111 upon some stationary portion of the machine and located through a notch 112 in the latch bolt 102, so that by raising the free end of the lifting bar 110, the latch bolt 102 may be raised out of engagement with the recess 104 in the plate 105 of the credit drawer, permitting the spring 96 to open said drawer.

Collars or washers 113 and 114 (Fig. 6) are fixed upon the sleeve 74 above and below the pinion 73 to form a guide for the same upon the rack teeth 72. Just above the upper collar 113 a collar 115 is fixed upon the shaft 75 as by the set screw 116 and provided with a lift finger 117 adapted to be moved to position beneath the free end of the lifting bar 107.

A similar collar 118 is fixed upon the lower portion of the shaft 75 as by the set screw 119 and provided with the lift finger 120 adapted to be moved into position beneath the free end of the lifting bar 110.

The drawers may be slidably mounted within the chassis frames in any suitable manner, the preferred construction being illustrated, in which the credit drawer 90 is mounted for horizontal sliding movement within the inverted U-shaped chassis frame members 92, by means of a series of channel members and rollers.

For this purpose a channel member 121 is fixed to the inner sides of the U-shaped chassis frames 92 at each side of the drawer 90. An oppositely disposed channel member 122 is telescoped over each channel member 121 and carries a roller 123 which rolls within the channel 121. This channel 122 is connected to the downturned ends 105a (Fig. 3) of the plate 105 and to the forwardly disposed angular ends 124 of the bar 125 (Fig. 4) as by the bolt 126 upon which the roller 123 is journaled, and rides upon the roller 123' mounted on the chassis frame.

Rollers 127 (Fig. 3) are carried upon the outer sides of the channel 122 and received in a channel 128 fixed to each side of the drawer 90, thus slidably supporting the drawer upon said rollers. For the purpose of taking up any lost motion, the bar 125 has springs 129 fixed upon its rear side for engagement with the back wall of the housing when the drawer is in closed position.

The spring 96 may be connected at its forward end to a stud 130 (Fig. 2) depending from the bar 131 spaced above the bottom wall of the housing as by the studs 132. The rear end of the spring 96 may be connected to the credit drawer catapult 133 which is slidably mounted upon the bar 131 and provided with the upturned angular flange 134 at its rear end for contacting with the rear end of the credit drawer.

Stop members in the form of plates 135 may be spot welded or otherwise fixed to the rear end of the drawer 90 and depend below the bottom thereof for engagement with the frame portion 136 at the front of the credit drawer housing to prevent the drawer from being accidentally withdrawn entirely from the housing. A bumper 137 is fixed upon the bar 131 to limit the forward movement of the credit drawer catapult 133.

A cam bar 138 is fixed to each side of the chassis frame 92 and provided with the tapered forward and rear ends 139 and 140 respectively. A latch lever 141 is pivoted as at 142 upon the side of the drawer and provided at its free end with a reduced extension 143 to which is connected one end of a pull spring 144, the other end thereof being connected to any suitable stationary point upon the drawer, being shown as connected to the rear end of the channel 128. A pin 145 is carried by the lever 141 near the free end thereof for contact with the inclined ends and lower edge of the cam bar 138.

A locking finger 146 depends from each side of the plate 105 and is adapted to engage the free end of the latch lever 141 as shown in Fig. 2, the lower end of said finger being inclined forwardly and upwardly as at 147 for a purpose to be later described.

A stop block 148 may be fixed upon each side of the credit drawer 90 just beyond the rear end of the channel 128 for engagement with the rearmost roller 127 as the drawer is opened. One or more stop pins 149 may be carried upon leaf springs 150 fixed at their rear ends to the underside of the plate 105, said stop pins being adapted for engagement with the front frame portion 151 of the credit drawer housing.

For the purpose of slidably mounting the cash drawer within its housing, a channel 152 (Figs. 2 and 6) may be fixed to each side of the cash drawer 89 as well as to the depending flanges 100a of the plate 100, said channel being arranged to roll upon rollers 153 carried by the chassis members 91. Rollers 154 are carried by the drawer 89 and adapted to roll in the channel members 155 fixed to the chassis members 91.

A cash drawer catapult 156 (Fig. 2) is slidably mounted upon the bar 157 spaced above the bottom wall of the cash drawer housing as by the studs 158, said catapult being provided with a bumper 159 for engagement with the rear end of the cash drawer. The spring 95 is connected at its forward end to a pin 160 depending from the bar 157 and at its rear end to the catapult 156. A stop block 161 is fixed upon the bar 157 to limit the forward movement of the catapult 156. Depending stop fingers 162 are provided at the rear end of the cash drawer 89 for engagement with the front portion 163 of the cash drawer housing to prevent accidental displacement of the cash drawer from the housing.

For the purpose of giving an audible signal whenever the cash drawer is opened, a gong 164 (Figs. 6 and 10) is carried by the plate 100. A tapper 165 is provided for this gong, in the form of a lever pivoted intermediate its ends upon the plate 100 as at 166, a spring 167 being provided for normally pulling said tapper toward the gong. In the normal position the tapper is held away from the gong, as shown in Fig. 10, by means of the pin 168 depending from the lifting bar 107.

In the operation of the machine, supposing a cash sale is made, the amount of the sale is set up in the machine by depressing the proper keys in the first six banks to the right. If it is desired to make a record of the item sold, the proper key in the bank 14 is also depressed.

It is necessary, in order to open the cash drawer 89, that one of the keys in the bank 13 of clerks' or department keys should be depressed before the operating handle 17 is pulled. Then, as the operating handle 17 is pulled forward, the roller 20 carried by the rocker arm 19 will engage the cam notch 21 in the oscillating plate 22, swinging said oscillating plate upon its pivot 23 and moving the pin 37 thereon into contact with the shoulder 34a in the opening 34 of the signal lever 29, pulling said signal lever forward and tilting the rocker arm 25 forward.

The rocker shaft 24 is thus oscillated, swinging the rocker arm 45 upward, the pin 46 thereof swinging upwardly through the arcuate slot 47 of the stop lever 48, swinging the lower end of said stop lever forward, and positioning the stop pin 50 thereon a predetermined distance forward from the stud 59 upon the angular bar 58 carried by the rack bar 52.

Since one of the keys in the bank 13 has been depressed, the corresponding link 60 will be allowed to move forward, as in usual practice, by the operation of the operating handle, and the stop flange or yoke 64 carried thereby will be moved away from the angular upturned end of the locking lever 65, permitting the spring 69 to swing said lever upon its pivot to a position releasing the locking stud 68 from the notch 67 of the lever whereby the spring 57 will pull the rack bar 52 forward until the stud 59 will again contact the stop pin 50.

During this operation of the rack bar the rack teeth 72 thereof cooperating with the pinion 73 will rotate the shaft 75 to a position bringing the lift finger 117 beneath the free end of the lifting bar 107 and rotating the collar 87 upon said shaft to such position that the cut-out portion 88 of said collar is not located above the angular end 86 of the lifting lever 85.

At the same time, through the forward movement of the operating handle, the link 81 will be pulled in the direction of the arrow shown in Fig. 5, as in the usual operation of the machine, swinging the bell crank yoke 80 upon its pivot 80', the arm 83 carried by said yoke being moved rearward moving the cam roller 84 thereon into the notch 85a in the underside of the lifting lever 85.

By this time the other parts of the mechanism will have assumed the positions just above described, whereupon further movement of the bell crank yoke 80 will cause the cam roller 84 to raise the lifting lever 85, the angular end 86 thereof engaging the collar 87 and slidably moving the shaft 75 upward.

The lift finger 117 having been positioned beneath the free end of the lifting bar 107, this upward movement of the shaft 75 will raise the lifting bar 107 and through the same will raise the latch bolt 97, against the pressure of the spring 101, out of engagement with the recess 99 in the plate 100, releasing the cash drawer and permitting the spring 95, acting through the cash drawer catapult 156, to quickly slide the cash drawer into open position.

As the lifting bar 107 is raised to withdraw the latch bolt 97 and release the cash drawer, the pin 168 carried by said lifting bar will be raised out of engagement with the end of the tapper 165, permitting the spring 167 to cause the tapper to strike the gong a sharp blow, giving an audible signal that the cash drawer is being opened.

Assuming that the transaction requires money to be paid out from the cash drawer, the amount is set up on the proper keys in the six banks at the right-hand side of the keyboard, the paid out key 28 is depressed to print "Paid out" on the record strip and one of the clerks' or department keys in the bank 13 must also be depressed in order to open the cash drawer when the operating handle is pulled.

The depression of the paid out key 28 will cause the angular lug 40 thereon to push the outer signal link 29 down until the notch 35 thereof registers with the lower notch 42a of the opening 42 in the inner link 30. When the operating handle 17 is pulled, the pin 37 upon the oscillating plate 22 will engage the notch 35 of the outer signalling link 29.

The operation of the parts will be as above described for a cash sale. There will be a slight difference in the travel of the stop lever 48 and the position of the stop pin 50 which will produce slightly less movement of the rack bar 52. However, the lift finger 117 will be positioned beneath the free end of the lifting bar 107 since it will be noted that, as shown in Fig. 7, the width of the lift finger 117 is sufficient to position the same beneath the free end of the lifting bar.

If a charge transaction is made, the amount is set up on the proper keys in the six righthand banks of the keyboard, the charge key 26 is depressed and a clerk or department key in the bank 13 must also be depressed in order that the credit drawer 90 will be opened when the operating handle is pulled. By depressing the charge key 26, the inner signalling link 30 will be pushed down so that the upper notch 42b thereof will be engaged by the pin 37 of the oscillating plate. This will cause the stop pin 50 to be moved to such position as to permit sufficient movement of the rack bar 52 to rotate the shaft 75 sufficiently to bring the lift finger 120 beneath the free end of the lifting bar 110.

Thus, when the shaft 75 is raised by means of the lifting lever 85, the lift finger 120 will raise the lifting bar 110, pulling the latch bolt 102 out of the recess 104 of the plate 105, releasing the credit drawer and permitting the spring operated catapult 133 to push the credit drawer open.

As the drawer moves toward open position, the pin 145 on the lever 141 will ride down the inclined end 140 of the cam bar 138 and onto the lower edge of said cam bar, releasing the lever 141 from engagement with the finger 146, thus disconnecting the plate 105 from the credit drawer so that as said drawer is pulled out to the fully opened position, the accounts at the rearmost end of the drawer will be accessible.

From the above it will be evident that neither the cash drawer nor credit drawer can be opened without operating a clerks' or department key in the bank 13, which in the usual manner will cause the clerks' or department symbol to be printed upon the record strip, whereby enforced registration is assured.

I claim:

1. A register including an adding machine unit and a plurality of drawers associated therewith, means normally urging each drawer to open position, latch bolts normally holding each drawer in closed position, a bank of clerk or department keys, operating means for the adding machine, normally inoperative latch bolt releasing means operable by said operating means, means released by any one of said clerk or department keys for rendering said latch bolt releasing means operative, movable stop means for limiting the operation of said latch bolt releasing means, and selective means controlling the position of said stop means to selectively release a predetermined latch bolt.

2. A register including an adding machine unit and a drawer associated therewith, means normally urging the drawer to open position, a latch bolt normally holding the drawer in closed position, a bank of clerk or department keys, operating means for the adding machine, a lifting lever operated by said operating means, a rotatable and longitudinally slidable shaft normally operatively disconnected from said lifting lever, a lift finger on said shaft normally inoperative to release said latch bolt, normally inoperative means for rotating said shaft, and means released by any one of said clerk or department keys for rendering said shaft rotating means operative whereby the shaft may be raised by said lifting lever and the lift finger may release said latch bolt.

3. A register including an adding machine unit and a drawer associated therewith, means normally urging the drawer to open position, a latch bolt normally holding the drawer in closed position, a bank of clerk or department keys, operating means for the adding machine, a lifting lever operated by said operating means, a rotatable and longitudinally slidable shaft normally operatively disconnected from said lifting lever, a lift finger on said shaft normally inoperative to release said latch bolt, normally inoperative rack and pinion means for rotating said shaft, and means released by any one of said clerk or department keys for rendering said rack and pinion means operative whereby the shaft may be raised by said lifting lever and the lift finger may release said latch bolt.

4. A register including an adding machine unit and a plurality of drawers associated therewith, means normally urging each drawer to open position, latch bolts normally holding each drawer in closed position, a bank of clerk or department keys, operating means for the adding machine, normally inoperative latch bolt releasing means operable by said operating means, means released by any one of said clerk or department keys for rendering said latch bolt releasing means operative, a movable stop lever for limiting the operation of said latch bolt releasing means, a plurality of signalling links operatively connected to said stop lever, and selective means for operatively connecting a predetermined signalling link to the operating means for controlling the position of said stop lever to selectively release a predetermined latch bolt.

5. A register including an adding machine unit and a drawer associated therewith, means normally urging the drawer to open position, a latch bolt normally holding the drawer in closed position, a bank of clerk or department keys, operating means for the adding machine, a lifting lever operated by said operating means, a rotatable and longitudinally slidable shaft normally operatively disconnected from said lifting lever, a lift finger on said shaft normally inoperative to release said latch bolt, normally inoperative means for rotating said shaft, means released by any one of said clerk or department keys, means operated by the keys for rendering said shaft rotating means operative, and stop means operated by said operating means for limiting the movement of said shaft rotating means whereby the shaft may be raised by said lifting lever and the lift finger may release said latch bolt.

6. A register including an adding machine unit and a drawer associated therewith, means normally urging the drawer to open position, a latch bolt normally holding the drawer in closed position, a bank of clerk or department keys, operating means for the adding machine, a lifting lever operated by said operating means, a rotatable and longitudinally slidable shaft normally operatively disconnected from said lifting lever, a lift finger on said shaft normally inoperative to release said latch bolt, normally inoperative rack and pinion means for rotating said shaft, means released by any one of said clerk or department keys, for rendering said rack and pinion means operative, and stop means operated by said operating means for limiting the movement of said rack and pinion means whereby the shaft may be raised by said lifting lever and the lift finger may release said latch bolt.

7. A register including an adding machine unit and a plurality of drawers associated therewith, means normally urging each drawer to open position, latch bolts normally holding each drawer in closed position, a bank of clerk or department keys, operating means for the adding machine, a lifting lever operated by said operating means, a rotatable and longitudinally slidable shaft normally operatively disconnected from said lifting lever, lift fingers on said shaft normally inoperative to release said latch bolts, normally inoperative means for rotating said shaft, means released by any one of said clerk or department keys for rendering said shaft rotating means operative, and selective means limiting the operation of said shaft rotating means whereby the shaft may be rotated to a predetermined position and may then be raised by said lifting lever to selectively cause one of said lift fingers to release one of said latch bolts.

HAROLD W. CLARK.